W. H. GWYNNE.
Gas Retort.
No. 1,504. Reissued June 30, 1863.
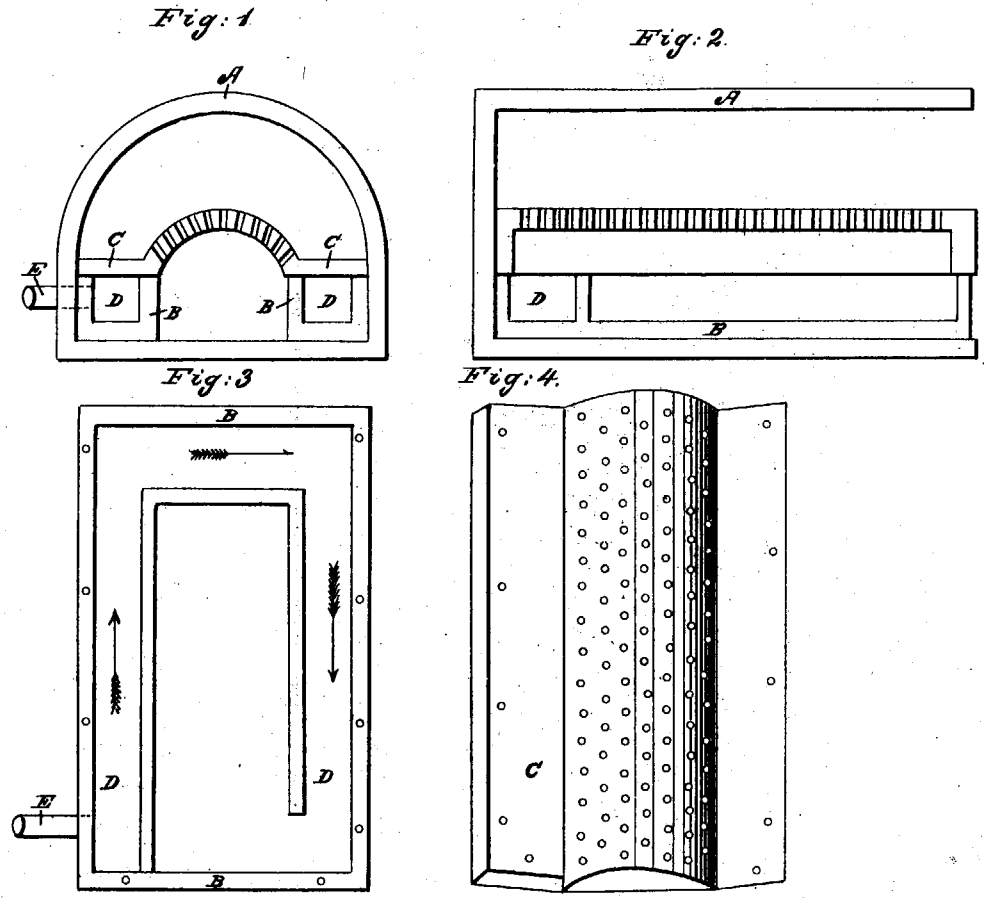
Witnesses:
Charles D. Brown Jr.
Inventor:
W. H. Gwynne.
N. PETERS, Photo-Lithographer, Washington, D. C.

UNITED STATES PATENT OFFICE.

WILLIAM. H. GWYNNE, OF WHITE PLAINS, NEW YORK.

IMPROVEMENT IN APPARATUS FOR MAKING WATER-GAS.

Specification forming part of Letters Patent No. 34,632, dated March 11, 1862; Reissue No. 1,504, dated June 30, 1863.

DIVISION A.

*To all whom it may concern:*

Be it known that I, WILLIAM H. GWYNNE, of White Plains, county of Westchester, State of New York, formerly of Brooklyn, in said State, have invented a new and useful Improvement in Apparatus for Making Water-Gas; and I do hereby declare that the following is a full and correct description thereof, reference being had to the annexed drawings, making a part of this specification, in which—

Figure 1 is a transverse section of a retort with my apparatus placed therein. Fig. 2 is a longitudinal section of the same. Fig. 3 shows the lower part of my apparatus with its interior circulating-passage and connecting pipe. Fig. 4 shows the cover of the same with its curved top and perforations.

The nature of my improvement consists in providing a box of any suitable metal, with a circulating-passage running around the same, with a cover perforated with fine holes for the purpose of passing the vapor of water in a finely-divided state upon the incandescent material with which the retort is filled after the distributer is placed within, and also for the purpose of delivering the vapor as dry as possible into the gas-retort.

To enable others skilled in the art to make and use my apparatus, I will proceed to describe its construction and operation.

My apparatus is made of cast-iron or any suitable material, in whatever shape or form it may be needed to fit the retort in which it is to be used.

The box C is provided with a circulating-passage, D, (plainly shown in Figs. 1, 2, and 3;) also, with a pipe, E, connecting with a steam-boiler or a water-siphon, so that when steam or water is let into pipe E it enters passage D and travels entirely around box B before passing through cover C into retort A, thereby becoming highly heated before entering the hot charcoal or coke with which the retort A is filled. By means of the high temperature and the finely divided state of the water-vapor cooling of the decomposing material is much retarded, a great deal of trouble having been met on the old plan by rapid cooling of decomposing material.

To operate my apparatus it is necessary to place the box B, with its cover C tightly bolted on, into retort A, and connected by pipe E with some steam or water pipe. The retort A is then filled with iron chips, charcoal, or any suitable material for decomposing water-vapor. The retort-mouth is then closed and a fire kindled beneath the retort. When heated to a bright-red heat, the steam or water may be allowed to enter through pipe E, and passing through circulating-space D it enters through the holes in C into the retort A, among the red-hot material contained therein and is there rapidly transformed into permanent gases.

And now, having thus fully described the construction and operation of my apparatus, what I claim as new, and desire to secure by Letters Patent, is—

The distributing-box B, with its circulating and heating passage D, and its perforated cover or top C, the whole operating substantially as herein described and shown, for the purpose set forth.

W. H. GWYNNE.

Witnesses:

CHARLES D. BROWN, Jr.,

C. ELTON BUCK.